United States Patent
Sim et al.

(10) Patent No.: US 12,184,937 B2
(45) Date of Patent: *Dec. 31, 2024

(54) VOICE RECOGNITION SYSTEM, VOICE RECOGNITION SERVER AND CONTROL METHOD OF DISPLAY APPARATUS FOR PROVIDING VOICE RECOGNITION FUNCTION BASED ON USAGE STATUS

(71) Applicant: SAMSUNG ELECTRONICS CO., LTD., Suwon-si (KR)

(72) Inventors: Jeong-Min Sim, Suwon-si (KR); Do-Wan Kim, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

This patent is subject to a terminal disclaimer.

(21) Appl. No.: 17/836,598

(22) Filed: Jun. 9, 2022

(65) Prior Publication Data

US 2022/0321965 A1 Oct. 6, 2022

Related U.S. Application Data (63) Continuation of application No. 16/742,577, filed on Jan. 14, 2020, now Pat. No. 11,381,879, which is a
(Continued)

(30) Foreign Application Priority Data

Nov. 12, 2013 (KR) ........................ 10-2013-0136983

(51) Int. Cl.
G10L 15/00 (2013.01)
G10L 15/22 (2006.01)
(Continued)

(52) U.S. Cl.
CPC ............. *H04N 21/47* (2013.01); *G10L 15/22* (2013.01); *H04N 5/60* (2013.01);
(Continued)

(58) Field of Classification Search
CPC ......... G10L 15/07; G10L 15/20; G10L 15/22; G10L 15/26; G10L 15/30; G10L 15/16;
(Continued)

(56) References Cited

U.S. PATENT DOCUMENTS 6,762,692 B1 7/2004 Mingot
9,262,405 B1 2/2016 Baliga
(Continued)

FOREIGN PATENT DOCUMENTS

JP 2002-041276 A 2/2002
KR 1993-0015797 A 7/1993
(Continued)

OTHER PUBLICATIONS

Communication dated Jul. 10, 2019, issued by the United States Patent Office in counterpart U. S. U.S. Appl. No. 14/311,972.
(Continued)

*Primary Examiner* — Vu B Hang
(74) *Attorney, Agent, or Firm* — Sughrue Mion, PLLC (57) ABSTRACT

Apparatuses and methods related to a voice recognition system, a voice recognition server and a control method of a display apparatus, are provided. More particularly, apparatuses and methods relate to a voice recognition system which performs a voice recognition function by using at least one of a current usage status with respect to the display apparatus and a function that is currently performed by the display apparatus. A voice recognition system includes: a voice receiver which receives a voice command; and a controller which determines at least one from among a current usage status with respect to a display apparatus and
(Continued)

a function currently performed by the display apparatus, determines an operation corresponding to the received voice command by using at least one from among the determined current usage status and the function currently performed by the display apparatus, and performs the determined operation.

10 Claims, 10 Drawing Sheets

Related U.S. Application Data continuation of application No. 14/311,972, filed on Jun. 23, 2014, now Pat. No. 10,555,041.

(51) Int. Cl.
*H04N 5/60* (2006.01)
*H04N 21/422* (2011.01)
*H04N 21/47* (2011.01)
*G10L 15/08* (2006.01)
*G10L 15/18* (2013.01)
*G10L 15/183* (2013.01)
*G10L 15/30* (2013.01)
*H04N 5/445* (2011.01)

(52) U.S. Cl.
CPC ....... *H04N 21/42203* (2013.01); *G10L 15/08* (2013.01); *G10L 15/1822* (2013.01); *G10L 15/183* (2013.01); *G10L 2015/228* (2013.01); *G10L 15/30* (2013.01); *H04N 5/445* (2013.01); *H04N 21/42222* (2013.01)

(58) Field of Classification Search
CPC ......... G10L 15/12; G10L 25/27; G10L 25/30; G10L 19/005; G10L 19/00; G10L 15/02; G10L 15/063; G10L 15/08; G10L 15/14; G10L 15/1815; G10L 15/197; G10L 15/10; G10L 25/87; G10L 17/00; G10L 17/02; G10L 17/04; G10L 17/06
See application file for complete search history.

(56) References Cited

U.S. PATENT DOCUMENTS

| | | | |
|---|---|---|---|
| 11,381,879 B2* | 7/2022 | Sim | G10L 15/22 |
| 2005/0172319 A1* | 8/2005 | Reichardt | H04N 21/47 |
| | | | 725/86 |
| 2006/0041926 A1 | 2/2006 | Istvan | |
| 2008/0021598 A1 | 1/2008 | Daude | |
| 2008/0103780 A1 | 5/2008 | Dacosta | |
| 2008/0154606 A1 | 6/2008 | Lee | |
| 2008/0221898 A1 | 9/2008 | Cerra | |
| 2010/0105364 A1* | 4/2010 | Yang | G06F 3/167 |
| | | | 704/235 |
| 2010/0312547 A1 | 12/2010 | Van Os | |
| 2011/0022388 A1 | 1/2011 | Wu | |
| 2011/0313775 A1 | 12/2011 | Laligand | |
| 2013/0073293 A1* | 3/2013 | Jang | G10L 15/22 |
| | | | 704/E21.001 |
| 2013/0312019 A1* | 11/2013 | McMillan | H04N 21/42203 |
| | | | 725/14 |
| 2014/0006022 A1 | 1/2014 | Yoon et al. | |
| 2014/0052450 A1 | 2/2014 | Cheong | |
| 2014/0052451 A1 | 2/2014 | Cheong | |

FOREIGN PATENT DOCUMENTS

| | | |
|---|---|---|
| KR | 10-2000-0034586 A | 6/2000 |
| KR | 1020020088693 A | 11/2002 |
| KR | 2003-0051368 A | 6/2003 |
| KR | 10-2004-0107232 A | 12/2004 |
| KR | 1020090093571 A | 2/2009 |
| KR | 10-2012-0083025 A | 7/2012 |
| KR | 10-2013-0068303 A | 6/2013 |
| KR | 101309794 B1 | 9/2013 |

OTHER PUBLICATIONS

Communication dated Dec. 31, 2018, issued by the United States Patent Office in counterpart U.S. Appl. No. 14/311,972.
Communication dated Sep. 20, 2018, issued by the United States Patent Office in counterpart U.S. Appl. No. 14/311,972.
Communication dated Apr. 19, 2018, issued by the United States Patent Office in counterpart U.S. Appl. No. 14/311,972.
Communication dated Jan. 2, 2018, issued by the United States Patent Office in counterpart U.S. Appl. No. 14/311,972.
Communication dated Jun. 15, 2017, issued by the United States Patent Office in counterpart U.S. Appl. No. 14/311,972.
Communication dated Feb. 28, 2017, issued by the United States Patent Office in counterpart U.S. Appl. No. 14/311,972.
Communication dated Jun. 30, 2016, issued by the United States Patent Office in counterpart U.S. Appl. No. 14/311,972.
Communication dated Mar. 10, 2016, issued by the United States Patent Office in counterpart U.S. Appl. No. 14/311,972.
KR Office Action dated Nov. 29, 2021, issued by Korean Intellectual Property Office in 10-2021-0030116.
Communication dated Aug. 27, 2015, issued by the United States Patent Office in counterpart U.S. Appl. No. 14/311,972.
Communication dated Dec. 8, 2020, issued by the Korean Intellectual Property Office in corresponding Korean Application No. 10-2013-0136983.
Communication dated Oct. 27, 2020, issued by the Korean Intellectual Property Office in corresponding Korean Application No. 10-2013-0136983.
Communication dated Apr. 10, 2020 issued by the Korean Intellectual Property Office in counterpart Korean Application No. 10-2013-0136983.
Communication dated May 28, 2021, issued by the Korean Intellectual Property Office in Korean Application No. 10-2021-0030116.
Korean Notice of Allowance dated Oct. 6, 2022, issued by the Korean Intellectual Property Office in App No. 10-2021-0030116.
Communication dated Jun. 13, 2022, issued by the Korean Intellectual Property Office in Korean Patent Application No. 10-2021-0030116.

* cited by examiner

VOICE RECOGNITION SYSTEM, VOICE RECOGNITION SERVER AND CONTROL METHOD OF DISPLAY APPARATUS FOR PROVIDING VOICE RECOGNITION FUNCTION BASED ON USAGE STATUS

CROSS-REFERENCE TO RELATED APPLICATION

This application is a Continuation Application of U.S. Application Ser. No. 16/742,577, filed on Jan. 14, 2020, which is a Continuation Application of U.S. patent application Ser. No. 14/311,972, filed on Jun. 23, 2014, which issued as U.S. Pat. No. 10,555,041 on Feb. 4, 2020, which claims priority from Korean Patent Application No. 10-2013-0136983, filed on Nov. 12, 2013 in the Korean Intellectual Property Office, the disclosure of which is incorporated herein by reference in its entirety.

BACKGROUND

Field

Systems, apparatuses and methods consistent with the exemplary embodiments relate to a voice recognition system, a voice recognition server and a control method of a display apparatus, and more particularly, to a voice recognition system, a voice recognition server and a control method of a display apparatus which performs a voice recognition function based on analysis of a current usage status of a user with respect to the display apparatus.

Description of the Related Art

Voice recognition technology is used to recognize a voice signal that has been obtained by collecting a voice input by a user, etc., as a signal corresponding to a predetermined language and may be used in various fields. In particular, an electronic apparatus such as a television (TV) or a mobile phone is provided with voice recognition functions that are performed via a microphone in addition to an existing input method using a remote controller. For example, a channel of a TV may be controlled by speaking a particular command such as "channel up", and then by recognizing a user's voice signal through a voice recognition engine of the TV.

In performing the voice recognition function through a user's speech, there arises no problem if the user's speech matches a function to be performed. However, if there are two or more functions that correspond to a user's speech and one of the functions is performed randomly, a user may be inconvenienced due to the performance of an unintended operation.

SUMMARY

Accordingly, one or more exemplary embodiments provide a voice recognition system, a voice recognition server and a control method of a display apparatus which ensures reliability and convenience in performing a voice recognition function as intended by a user by using at least one of a current usage status of a user with respect to the display apparatus and a function that is currently performed by the display apparatus.

According to an aspect of an exemplary embodiment, there is provided a control method of a display apparatus including: receiving a voice command of a user; determining at least one from among a current usage status with respect to the display apparatus and a function that is currently performed by the display apparatus; determining an operation corresponding to the received voice command by using at least one from among the determined current usage status and the function currently performed by the display apparatus; and performing the determined operation.

The determining the operation may include determining the operation corresponding to at least one from among the user's current usage status and the function currently performed by the display apparatus, out of a plurality of possible operations corresponding to results of voice recognition performed based on the received voice command.

The determining the operation may include determining at least one operation by using the at least one from among the current usage status and the function currently performed by the display apparatus and voice recognition performed based on the voice command.

The determining the operation may include determining a service corresponding to the at least one from among the current usage status and the function currently performed by the display apparatus out of a plurality of services provided by the display apparatus; and determining the at least one operation corresponding to the determined service.

The determining the service may include determining what the current usage status is among a plurality of usage statuses, the user statuses including at least one from among channel selection, chat, menu selection and search request.

The determining the operation may include determining at least one operation based on a degree of similarity to the service corresponding to the at least one from among the current usage status and the function currently performed by the display apparatus, out of a plurality of operations corresponding to results of the performed voice recognition.

The performing the determined operation may include displaying a user selection window including a plurality of operations that corresponds to a result of voice recognition if a predetermined voice command is provided with respect to the performed operation.

The control method of a display apparatus may further include storing the received user's voice command and information related to the performed operation, and the performing the operation may include performing the operation based on the stored information related to the operation if the received voice command is same as the stored voice command.

The control method of a display apparatus may further include performing voice recognition with respect to the received voice command.

The control method of a display apparatus may further including requesting an external apparatus to perform voice recognition according to the received voice command; and receiving results of the performed voice recognition from the external apparatus.

According to an aspect of an exemplary embodiment, there is provided a voice recognition system including: a voice receiver which receives a command; and a controller which determines at least one from among a current usage status with respect to a display apparatus and a function currently performed by the display apparatus, determines an operation corresponding to the received voice command by using the at least one from among the determined current usage status and the function currently performed by the display apparatus, and performs the determined operation.

The controller may determine the operation corresponding to the at least one from among the current usage status and the function currently performed by the display apparatus, out of a plurality of operations corresponding to results of voice recognition performed according to the received voice command.

The controller may determine at least one operation by using the at least one from among the current usage status and the function currently performed by the display apparatus, and the voice recognition performed according to the voice command.

The controller may determine a service that corresponds to the at least one from among the current usage status and the function currently performed by the display apparatus, out of a plurality of services provided by the display apparatus, and determines the at least one operation corresponding to the determined service.

The controller may determine the corresponding service by determining what the current usage status is among a plurality of usage statuses, the plurality of usage statuses including at least one from among channel selection, chat, menu selection and search request.

The controller may determine the at least one operation based on a degree of similarity to a service corresponding to the at least one from among a current usage status and a function currently performed by the display apparatus, out of a plurality of operations corresponding to results of the performed voice recognition.

The voice recognition system may further include a display unit which displays an image thereon, and the controller may control the display unit to display a user selection window thereon, the window including a plurality of operations corresponding to results of voice recognition if a predetermined voice command is provided with respect to the performed operation.

The voice recognition system may further include a storage which stores therein the received voice command and information related to the performed operation corresponding to the voice command, and the controller may perform an operation based on the stored information related to the operation if the received voice command is a voice command stored in the storage.

According to an aspect of an exemplary embodiment, there is provided a voice recognition server including: a communicator which is connected to a display apparatus; and a controller which receives a voice command from the display apparatus, determines at least one operation corresponding to at least one from among a current usage status with respect to the display apparatus and a function currently performed by the display apparatus and the received voice command, and controls the communicator to transmit the determined at least one operation to the display apparatus.

The controller may determine the at least one operation corresponding to the at least one from among the current usage status with respect to the display apparatus and the function currently performed by the display apparatus, out of a plurality of operations corresponding to results of voice recognition performed according to the received voice command.

The controller may determine at least one operation by using the at least one from among the current usage status with respect to the display apparatus and the function currently performed by the display apparatus, and voice recognition performed according to the voice command.

The controller may determine a service that corresponds to the at least one from among the current usage status and the function currently performed by the display apparatus out of a plurality of services provided by the display apparatus, and determines the at least one operation corresponding to the determined service.

The controller may determine the corresponding service by determining what the current usage status is among a plurality of usage statuses, the plurality of usage statuses including at least one from among channel selection, chat, menu selection and search request.

The controller may determine the at least one operation based on a degree of similarity to a service corresponding to at least one from among the current usage status and the function that is currently performed by the display apparatus, out of a plurality of operations corresponding to results of performed voice recognition.

The voice recognition server may further include a storage which stores therein the received voice command and information related to the performed operation corresponding to the voice command, and the controller determines an operation based on the stored information if the received user's voice command is a voice command stored in the storage.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
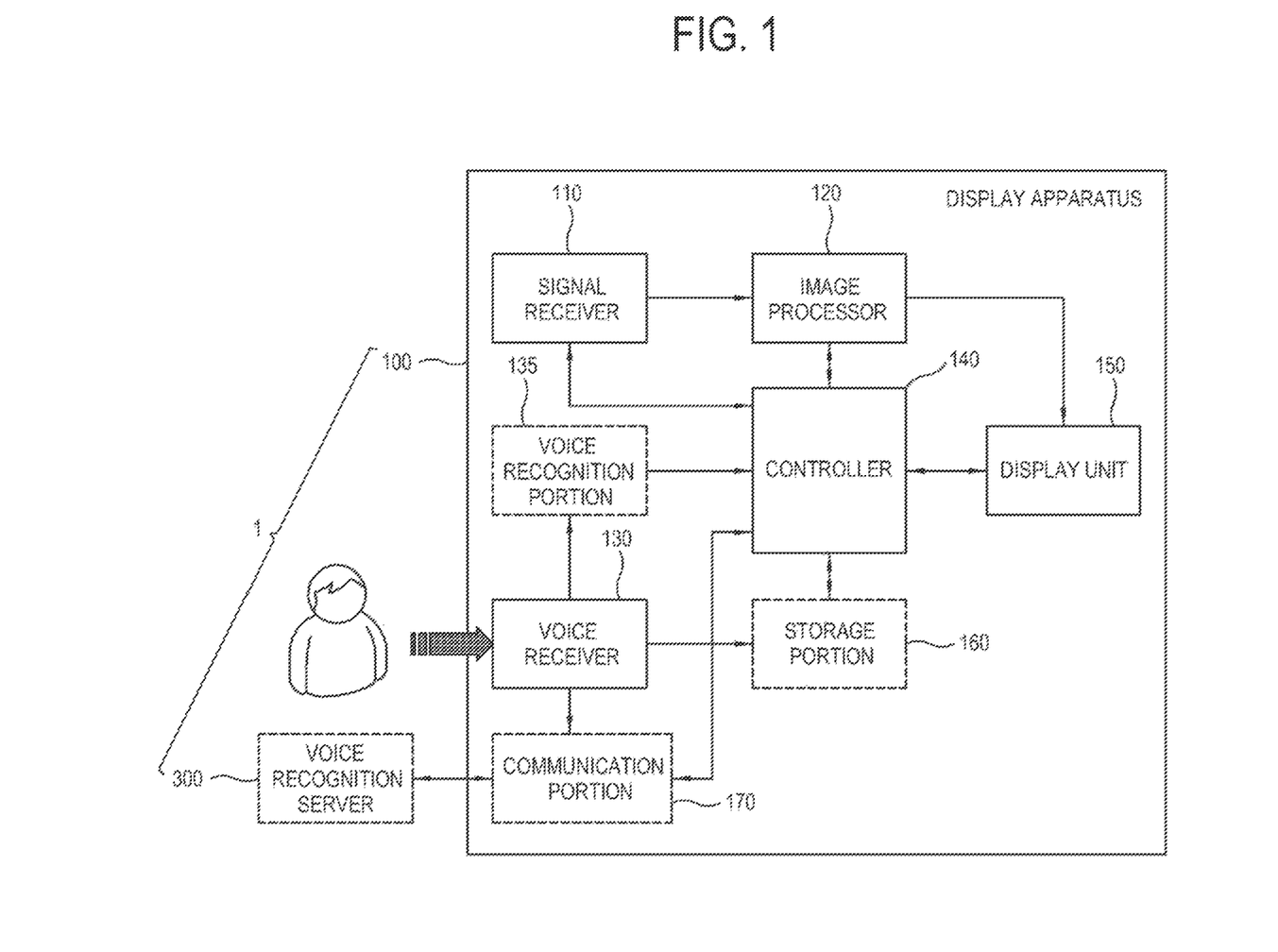
FIG. 1 is a block diagram of a voice recognition system according to an exemplary embodiment.

Hereinafter, features of respective elements of a voice recognition system according to an exemplary embodiment will be described in detail with reference to FIG. 1. FIG. 1 is a block diagram of a voice recognition system according to an exemplary embodiment. As shown therein, a voice recognition system 1 may include a display apparatus 100 and a voice recognition server 300, or may include only a display apparatus 100.

The display apparatus 100 includes a signal receiver 110, an image processor 120, a voice receiver 130, a controller 140, and a display unit 150, and may further include at least one of a voice recognition portion 135, a communication portion 170 and a storage portion 160. The display apparatus 100 may be implemented as, e.g., a TV, and may be connected to a voice recognition server 300 through the communication portion 170.

The signal receiver 110 receives an image signal of at least one channel. The signal receiver 110 may be provided as various types depending on a standard of a received image signal and an implementation type of the display apparatus 100. For example, the signal receiver 110 may be implemented as a tuner to receive a radio frequency (RF) broadcasting signal from a broadcasting station. Otherwise, the signal receiver 110 may be connected to a peripheral imaging device such as a digital versatile disc (DVD) or a personal computer (PC) to receive an image signal therefrom.

The image processor 120 processes a received image signal according to preset image processing operations. The image processing operations of the image processor 120 includes, without limitation, decoding, de-interlacing, scaling, noise reduction, detail enhancement, etc. The image processor 120 may be implemented as a system-on-chip (SoC) which performs integrated functions of the aforementioned operations, or as an image processing board on which individual elements are installed to perform the aforementioned operations independently.

The display unit 150 displays an image thereon based on an image signal that is output by the image processor 120. The display unit 150 may be implemented as various types including, without limitation, a plasma display panel (PDP), a liquid crystal display (LCD), an organic light emitting diodes (OLED) and a flexible display.

The voice receiver 130 receives a user's voice command. The voice receiver 130 receives a user's voice command as a single voice signal. Since the voice signal that is received by the voice receiver 130 may include various noises in addition to a user's voice which is subject to voice recognition, the voice receiver 130 may extract a user's voice from the received voice signal through a pre-processing operation, such as frequency analysis, and perform a voice recognition to the extracted voice.

The controller 140 determines at least one of a user's current usage status with respect to the display apparatus 100 and a function that is currently performed by the display apparatus 100. For example, the user's current usage status and the function currently performed by the display apparatus 100 may include a TV channel watching status or Internet search, TV menu selection or content execution status. By using at least one of the user's current usage status and the function currently performed by the display apparatus 100 as determined by the controller 140, the controller 140 determines an operation corresponding to a received voice command, and performs the determined operation.

Out of a plurality of operations corresponding to results of a voice recognition that has been performed according to a voice command received by the voice receiver 130, the controller 140 may determine an operation corresponding to at least one of a user's current usage status and a function currently performed by the display apparatus 100 and may perform the determined operation. Examples of the operation corresponding to the results of the voice recognition may include a TV channel change, display of Internet search results, TV menu execution, and execution of contents such as movies, videos and music files.

The controller 140 may determine at least one function by using at least one of a user's current usage status and a function currently performed by the display apparatus 100, and a voice recognition of a voice command.

Figure 4:
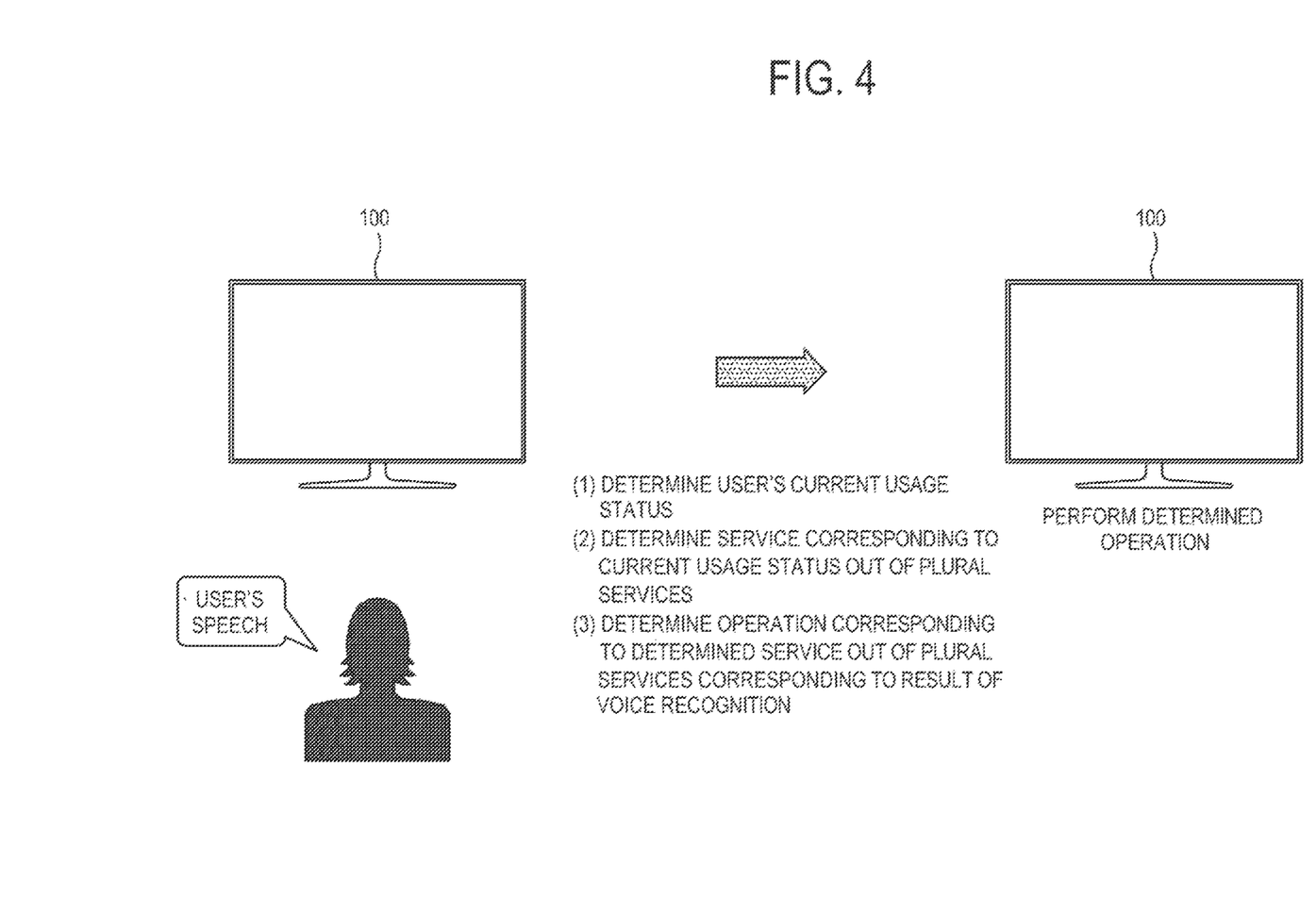
FIG. 4 illustrates a performance process of a voice recognition function by the voice recognition system through a user's speech according to an exemplary embodiment.

More specifically, as shown in FIG. 4, the controller 140 may determine a service that corresponds to at least one of a user's current usage status and a function currently performed by the display apparatus 100 out of a plurality of services that may be provided by the display apparatus 100, and may determine at least one operation corresponding to the determined service. The plurality of services includes various services that may be provided by the display apparatus 100 such as provision of TV broadcasting channels, provision of contents such as movies, video and music files, Internet, home shopping, and interactive VOD service. The controller 140 may determine what a user's current usage status is among a plurality of usage statuses including at least one of channel selection, chat, menu selection and search request. For example, if a user is doing a video chat while watching TV news, a user's current usage status may be determined to be 'channel selection' or 'chat'. If a user's speech is 'I'm hungry' or 'order pizza', the user's current status may be determined to be 'chat' rather than 'channel selection' and an 'order service' may be determined to be a corresponding service based on the user's speech.

The controller 140 may determine at least one operation based on a degree of similarity to a service corresponding to at least one of a user's current usage status and a function currently performed by the display apparatus 100, out of a plurality of operations corresponding to results of a voice recognition performed. In an exemplary embodiment, if a service corresponding to a user's current usage status is 'provision of broadcasting channel', an 'execution of TV broadcasting' which is most similar to the 'provision of broadcasting channel' service may be determined to be a corresponding operation out of a plurality of operations, such as 'execution of TV broadcasting', 'execution of cable broadcasting' and 'execution of VOD on the Internet', which are related services.

Information related to classification of a user's voice command and a user's current usage status, classification of service corresponding to a current usage status and classification of operations corresponding to services may be stored as corresponding data in the storage portion 160 for management.

If a user gives a predetermined voice command for an operation performed, the controller 140 may control the display unit 150 to display thereon a user selection window (not shown) for a plurality of operations corresponding to results of a voice recognition. That is, if an operation performed according to a user's voice command is not an operation desired by a user, a user may give a predetermined voice command such as 'cancel' or 'another screen', and accordingly the display unit 150 may display thereon a user selection window showing a predetermined number of operations corresponding to results of voice recognition in the order or priority based on the degree of similarity for a user to select an operation.

In another exemplary embodiment, the display apparatus 100 may further include a storage portion 160 to store therein information related to a user's received voice command and information of the operation performed according to the voice command. In such case, if a received user's voice command is a voice command that is stored in the storage portion 160, the controller 140 may perform an operation based on the information related to the stored operation. For example, if the operation of 'execution of SBS news channel' has been performed according to a user's voice command such as 'SBS' in the past and related information has been stored in the storage portion 160 and if a user's voice command of 'SBS' is received again thereafter, the display apparatus 100 may forgo the determination process of an operation that corresponds to results of voice recognition, and may receive operation information corresponding to the voice command 'SBS' from the storage portion 160, and may perform the operation.

The display apparatus 100 may further include a voice recognition portion 135 to perform a voice recognition with respect to a voice command received by the voice receiver 130. The voice recognition portion 135 performs a voice recognition with respect to a voice command that is received by the voice receiver 130. The voice recognition portion 135 may be implemented as an embedded engine that is provided in the display apparatus 100, or as an additional voice recognition server 300 according to another exemplary embodiment, or as a single processor including the controller 140.

The voice recognition portion 135 may recognize a particular word that is set for a user's voice input that is given to control the display apparatus 100. For example, if a user inputs a voice signal such as 'channel up', 'power off' or 'mute', the voice recognition portion 135 may recognize the voice signal and if the voice signal is recognized as one of preset languages included in a stored language list, may output the recognized language data. The embedded engine may be implemented by a memory with a small capacity, and may provide superior speed.

In another exemplary embodiment, the display apparatus 100 may be connected to a voice recognition server 300 to perform a voice recognition with respect to a voice command that is received by the voice receiver 130. If the voice recognition portion 135 is provided as the voice recognition server 300, the display apparatus 100 may transmit a voice signal corresponding to the voice command received by the voice receiver 130, to the voice recognition server 300 through the communication portion 170, and may receive results of voice recognition from the voice recognition server 300. Unlike the case where the voice recognition portion 135 is implemented as an embedded engine, the voice recognition server 300 may recognize various words or consecutive words. For example, inputting a particular search word in a search window or inputting a sentence through an application such as social networking service (SNS) requires recognition of many words, and thus it is not easy to recognize such words through the embedded engine. But such recognition may be performed through the voice recognition server 300.

In another exemplary embodiment, the voice recognition portion 135 may be implemented as a single processor included in the controller 140. In such case, the voice recognition portion 135 may be included in the controller 140 rather than being an additional component of the display apparatus.

Figure 2:
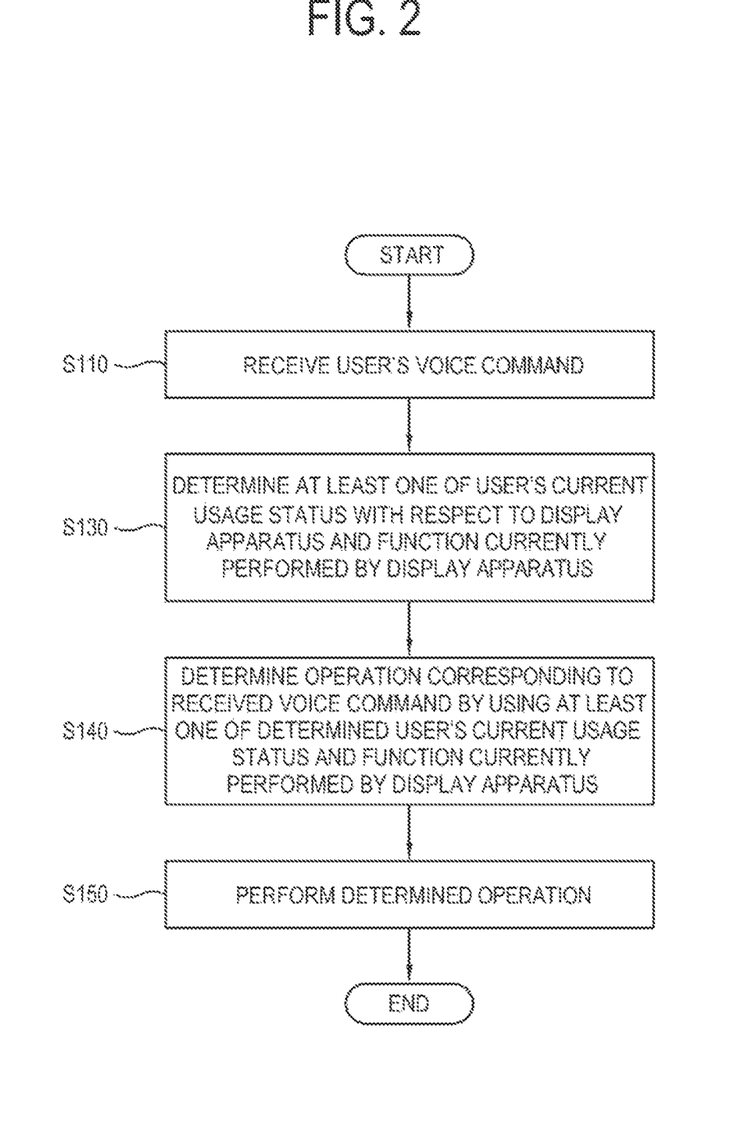
FIGS. 2 and 3 are flowcharts showing a control method of a display apparatus according to an exemplary embodiment.

Hereinafter, features of a control method of the display apparatus 100 according to the exemplary embodiment will be described in detail with reference to FIGS. 2 and 3, and FIGS. 4 to 9 as necessary. FIG. 2 is a flowchart showing a control method of the display apparatus 100 according to an exemplary embodiment. As shown therein, the display apparatus 100 receives a user's voice command (S110). The controller 140 determines at least one of a user's current usage status with respect to the display apparatus 100 and a function currently performed by the display apparatus 100 (S130). The controller 140 determines the operation that corresponds to the received voice command by using at least one of the determined user's current usage status and the function currently performed by the display apparatus 100 (S140), and performs the determined operation (S150).

The operation S140 may include determining an operation that corresponds to at least one of the user's current usage status and the function currently performed by the display apparatus 100 out of a plurality of operations corresponding to results of voice recognition performed according to the received voice command. The voice recognition performed according to the received voice command in connection with the operation S140 may be performed before the operation S130 of determining at least one of the user's current usage status with respect to the display apparatus 100 and the function currently performed by the display apparatus 100, or may be performed after the operation S130. The operation S140 may include determining at least one operation by using at least one of the user's current usage status and the function currently performed by the display apparatus 100, and voice recognition performed according to the voice command.

Figure 5:
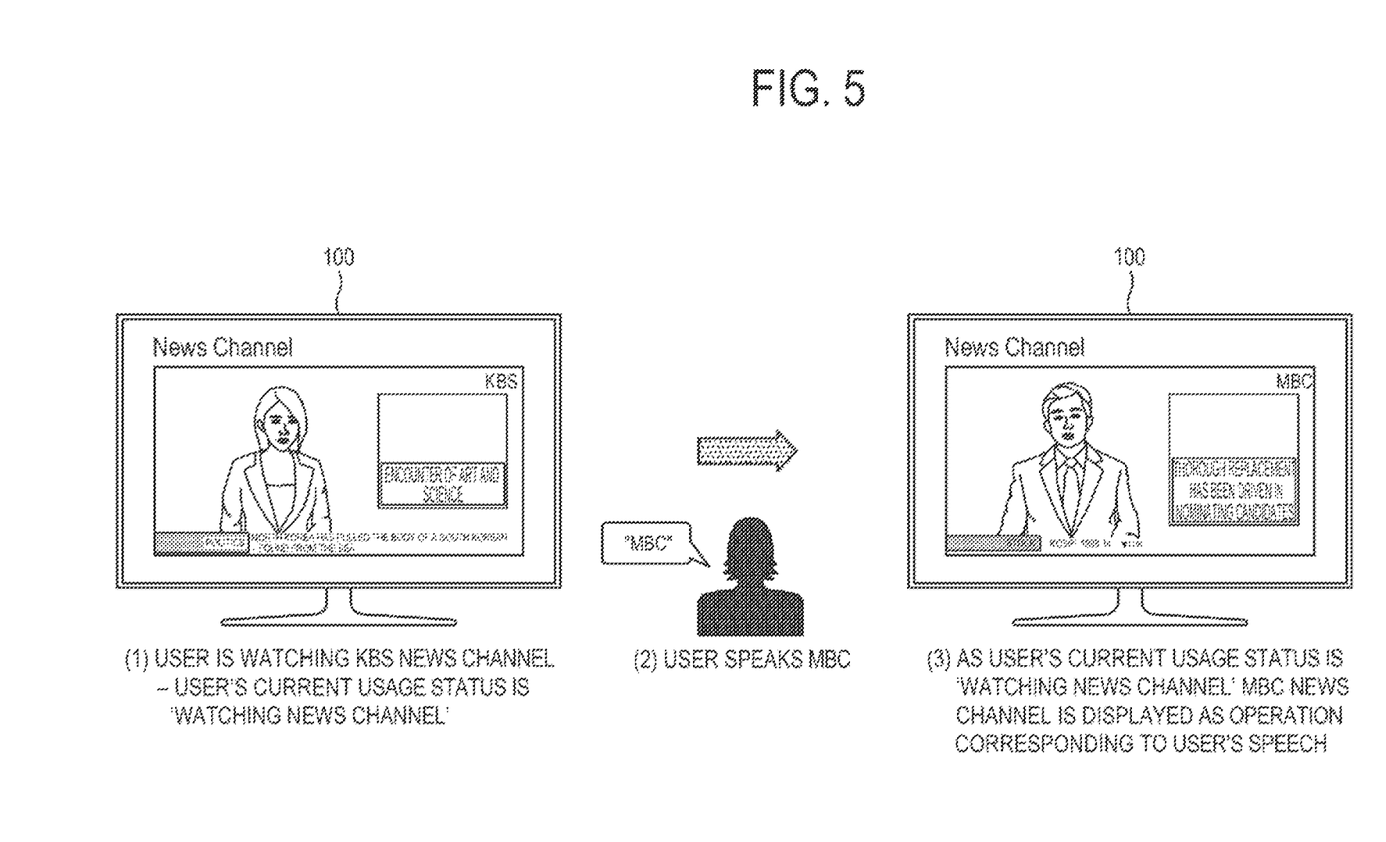
FIGS. 5 to 9 illustrate examples of operations of the voice recognition system according to an exemplary embodiment.
Figure 6:
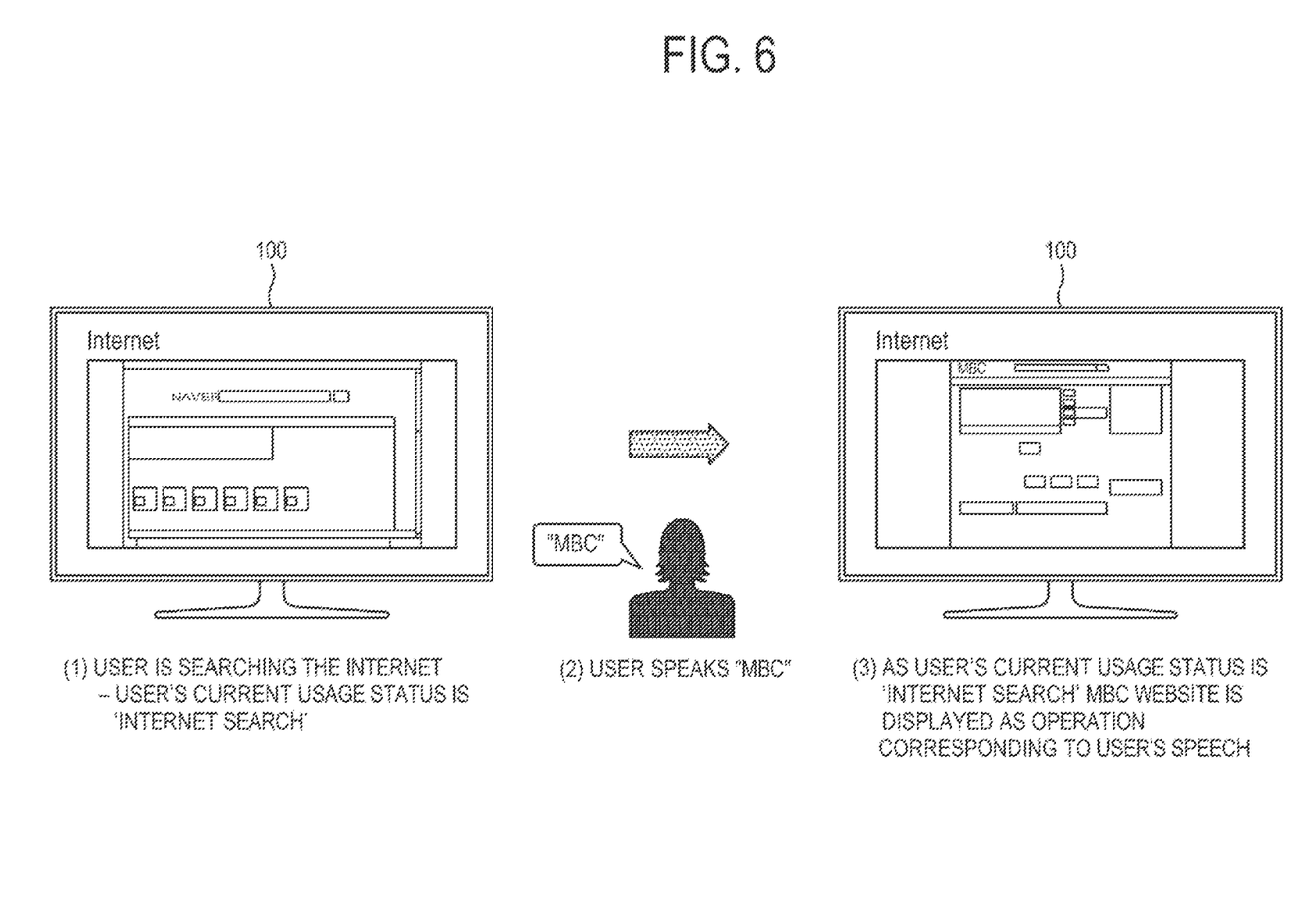
Figure 7:
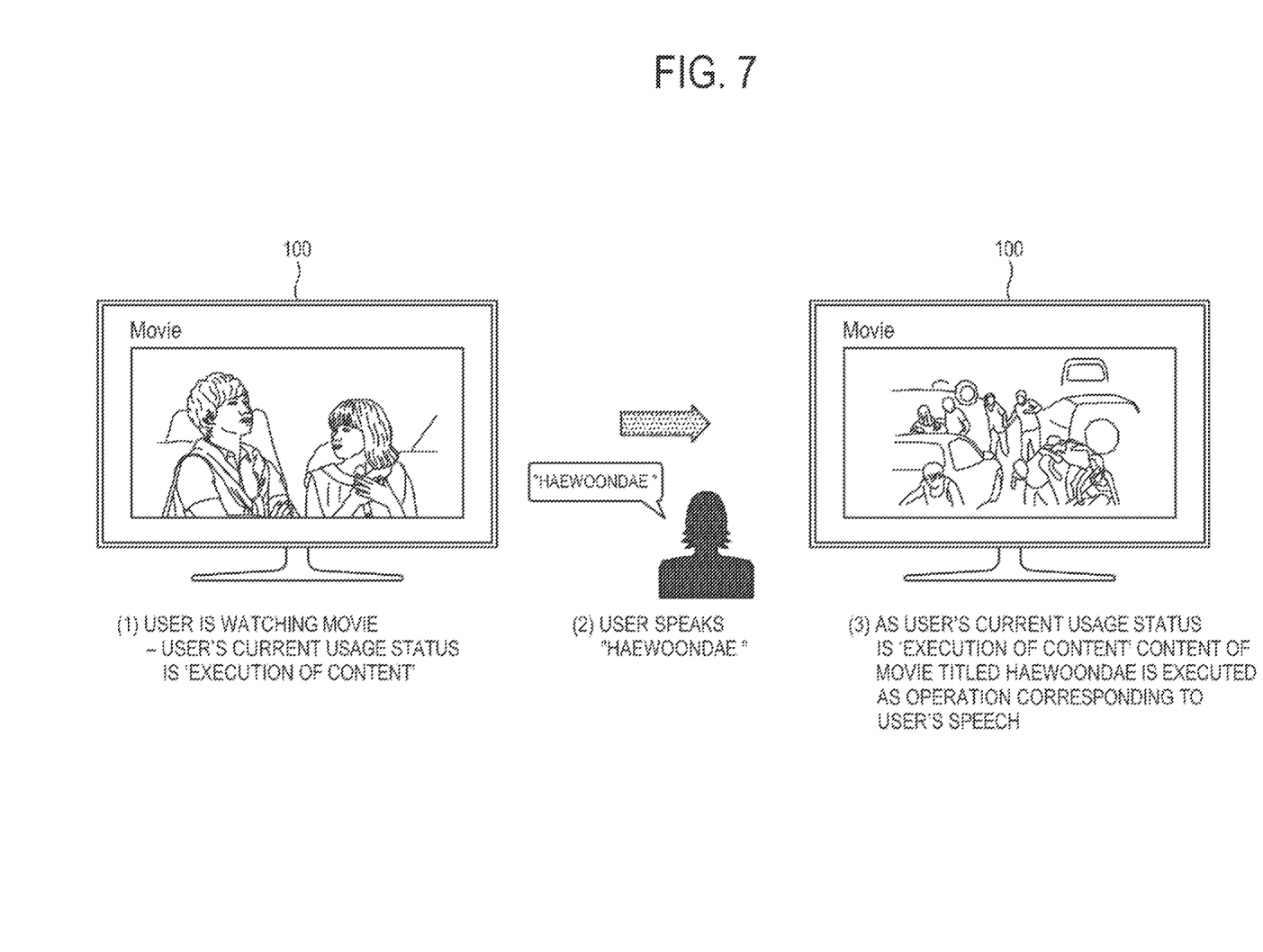
Figure 8:
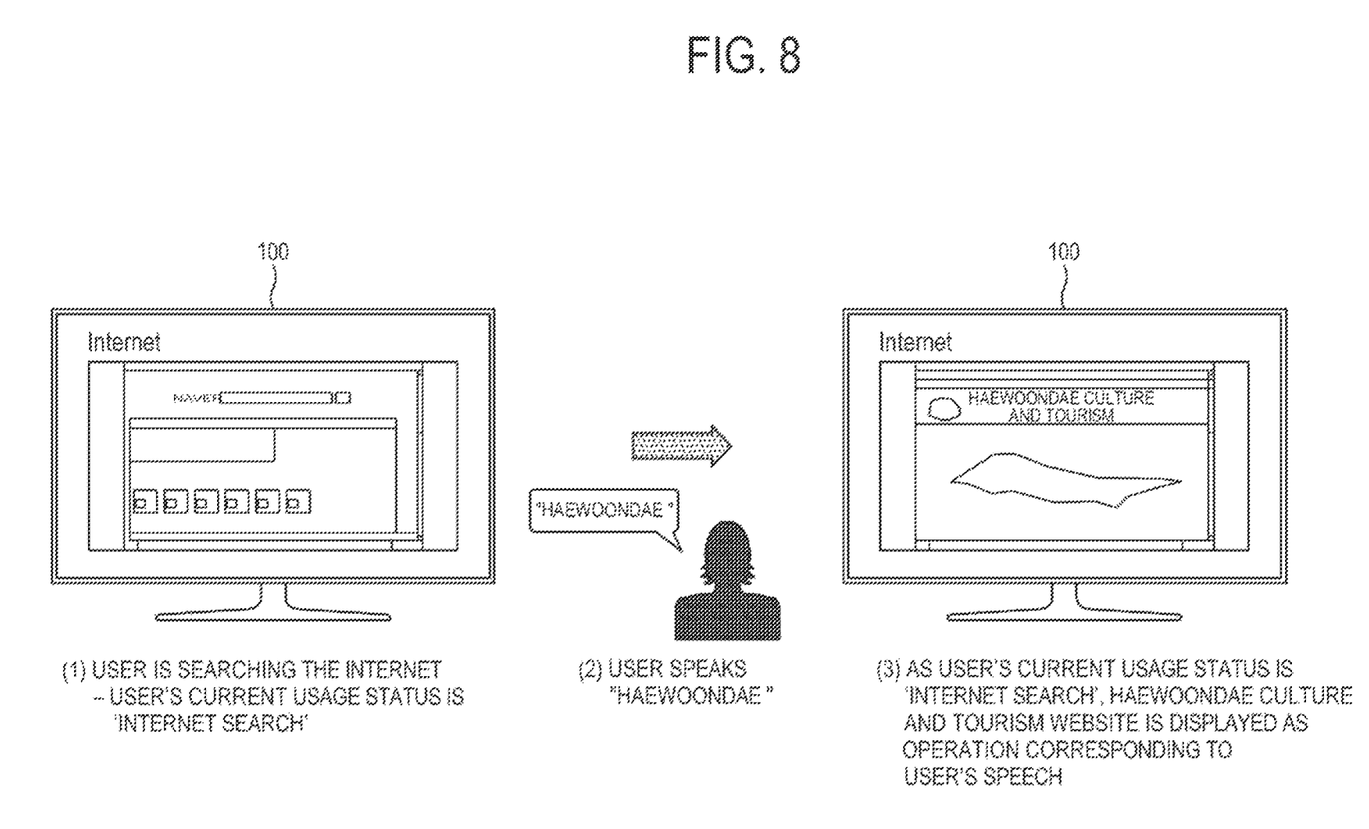

As a detailed example, as shown in FIG. 5, if a user speaks 'MBC' while watching KBS news channel, the display apparatus 100 determines that the user's current usage status is 'watching news channel' and may display the MBC news channel as an operation corresponding to results of voice recognition with respect to the user's speech of 'MBC'. As another example, as shown in FIG. 6, if a user speaks 'MBC' while using the Internet, the display apparatus 100 may determine that the user's current usage status is 'Internet search' and may display MBC website as an operation corresponding to results of voice recognition performed according to the user's speech of 'MBC'. In an example in FIG. 7, if a user speaks 'Haewoondae' while watching a movie, the display apparatus 100 may determine that the user's current usage status is 'execution of content' and execute a movie titled 'Haewoondae' as an operation corresponding to the results of voice recognition performed according to the user's speech of 'Haewoondae'. In an example in FIG. 8, if a user speaks 'Haewoondae' while using the Internet, the display apparatus 100 may determine that the user's current usage status is 'Internet search' and may display Haewoondae culture and tourism website as an operation corresponding to results of voice recognition performed according to the user's speech of 'Haewoondae'.

Figure 9:
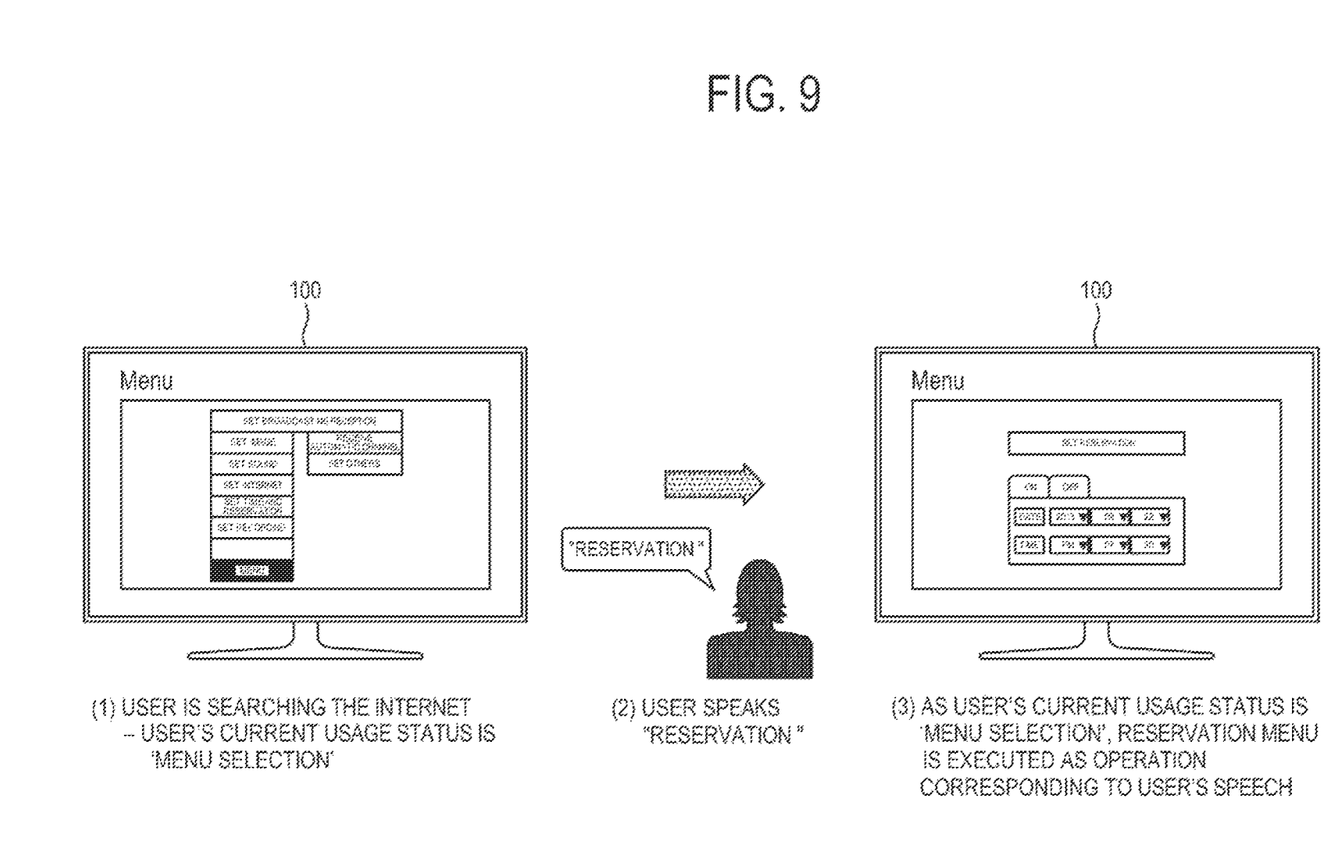

As another example, as shown in FIG. 9, if a user speaks 'reservation' while selecting a menu of the display apparatus 100, the display apparatus 100 may determine that the user's current usage status is 'menu selection' and may automatically execute a reservation menu as an operation corresponding to results of voice recognition performed according to the user's speech of 'reservation'.

Figure 3:
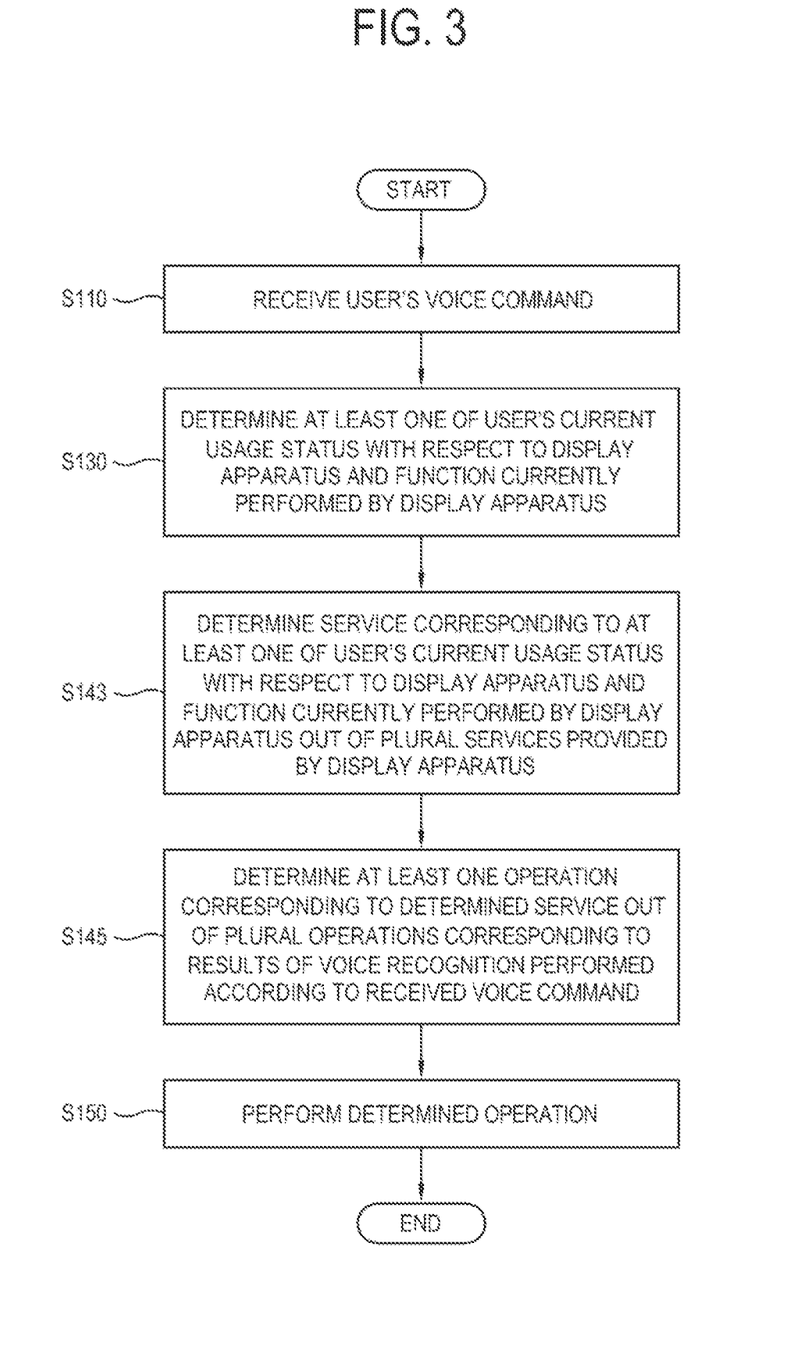

FIG. 3 is a flowchart showing a more detailed control method of the display apparatus that has been explained in FIG. 2. As shown therein, the display apparatus 100 receives a user's voice command (S110), and the controller 140 determines at least one of the user's current usage status with respect to the display apparatus 100 and the function currently performed by the display apparatus 100 (S130). The controller 140 determines a service corresponding to at least one of the user's current usage status and the function currently performed by the display apparatus 100, out of the plurality of services that may be provided by the display apparatus 100 (S143). The operation S143 may include determining a corresponding service by determining what the user's current usage status is among the plurality of usage statuses including at least one of channel selection, chat, menu selection, and search request. The controller 140 determines at least one operation corresponding to the determined service out of the plurality of operations corresponding to the results of voice recognition performed according to the received voice command (S145). The operation S145 may include determining at least one operation based on the degree of similarity to the service corresponding to at least one of the user's current usage status and the function currently performed by the display apparatus 100. The voice recognition performed according to the received voice command in connection with the operation S145 may be performed before the operation S130 of determining at least one of the user's current usage status with respect to the display apparatus 100 and the function currently performed by the display apparatus 100, or may be performed after the operation S130. Lastly, the controller 140 performs the determined operation (S150). The operation S150 may include displaying a user selection window for a plurality of operations corresponding to results of voice recognition if a user gives a predetermined voice command with respect to the performed operation.

The control operation of the display apparatus 100 may further include an operation of storing information of the received user's voice command and the operation performed according to the voice command. In such case, the operation S150 of performing the determined operation may include performing the operation based on the information of the stored operation if the received user's voice command is the stored voice command.

Figure 10:
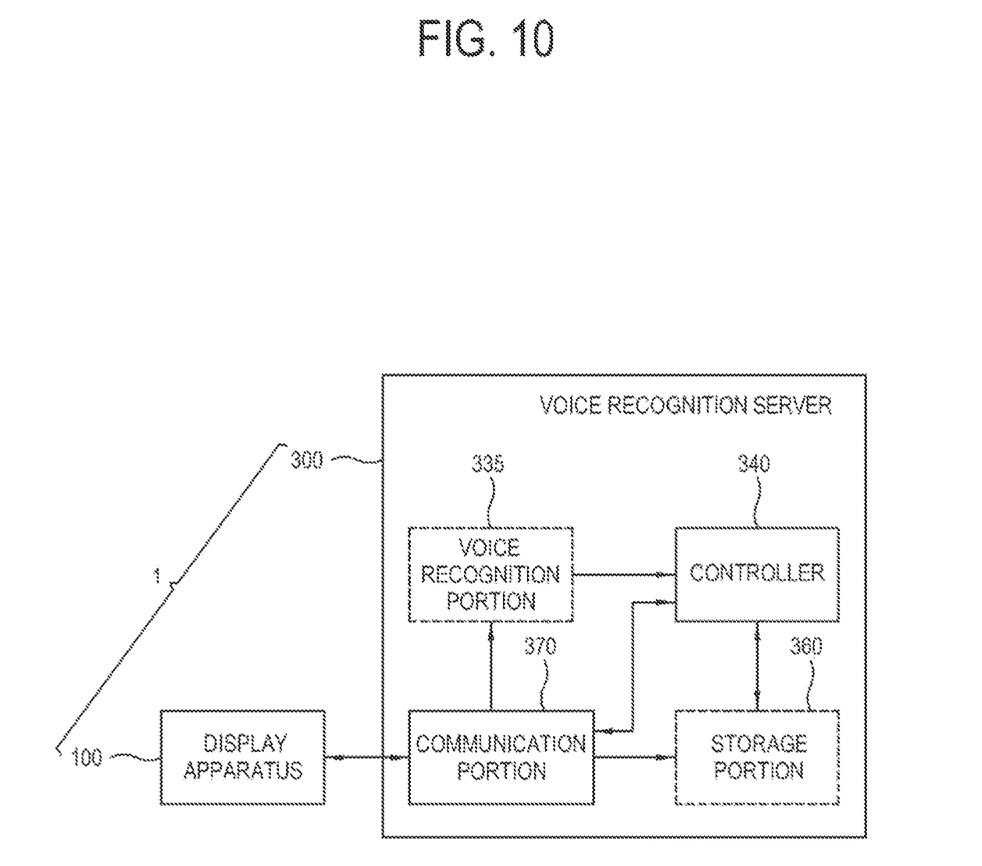
FIG. 10 is a block diagram of a voice recognition server according to an exemplary embodiment.

Hereinafter, features of respective elements of the voice recognition server 300 according to an exemplary embodiment will be described in detail with reference to FIG. 10. FIG. 10 is a block diagram of the voice recognition server 300 according to an exemplary embodiment. The voice recognition server 300 includes a controller 340 and a communication portion 370, and may be connected to the display apparatus 100 to be implemented as a voice recognition system 1. In another exemplary embodiment, the voice recognition server 300 may further include a voice recognition portion 335 or a storage portion 360. The communication portion 370 of the voice recognition server 300 communicates with the display apparatus 100. The controller 340 receives a user's voice command from the display apparatus 100, and determines an operation corresponding to at least one of a user's current usage status with respect to the display apparatus 100 and a function currently performed by the display apparatus 100 and the received voice command. The controller 340 controls the communication portion 370 to transmit the determined operation to the display apparatus 100.

The controller 340 may determine an operation corresponding to at least one of the user's current usage status with respect to the display apparatus and the function currently performed by the display apparatus 100, out of a plurality of operations corresponding to results of voice recognition performed according to the received voice command. The controller 340 may determine the at least one operation by using at least one of the user's current usage status with respect to the display apparatus 100 and the function currently performed by the display apparatus 100, and the voice recognition performed according to the voice command.

The controller 340 may determine a service that corresponds to at least one of the user's current usage status with respect to the display apparatus 100 and the function currently performed by the display apparatus 100 out of a plurality of services that may be provided by the display apparatus 100, and may determine at least one operation corresponding to the determined service. The controller 340 may determine the corresponding service by determining what the user's current usage status with respect to the display apparatus 100 is among the channel selection, chat, menu selection and search request. The controller 340 may determine the at least one operation based on the degree of similarity to the service corresponding to at least one of the user's current usage status with respect to the display apparatus 100 and the function currently performed by the display apparatus 100, out of the plurality of operations corresponding to results of voice recognition performed to the received voice command.

The voice recognition server 300 may further include a storage portion 360 to store therein information of the received user's voice command and the determined operation corresponding to the voice command. If the received user's voice command is the same as a voice command that is stored in the storage portion 360, the controller 340 may determine the operation based on the corresponding stored information. The voice recognition server 300 may further include a voice recognition portion 335 to perform voice recognition with respect to a received voice command. In an exemplary embodiment, in the voice recognition system 1, the voice recognition portion 335 of the voice recognition server 300 may perform voice recognition according to the user's voice command provided by the display apparatus 100. In another exemplary embodiment, the voice recognition system 1 may be implemented so that the display apparatus 100 may perform voice recognition according to a part of the received user's voice command, and the voice recognition portion 335 of the voice recognition server 300 may perform voice recognition according to the other part of the received user's voice command.

As described above, a voice recognition system, a voice recognition server and a control method of a display apparatus may ensure reliability and convenience in performing a voice recognition function as intended by a user based on analysis of a user's current usage status with respect to the display apparatus.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display apparatus comprising:
   an interface circuitry;
   a display; and
   a processor configured to:
      receive a user voice input through the interface circuitry,
      control the display to display a user interface (UI) comprising a plurality of operations corresponding to the received user voice input, the plurality of operations being available in the display apparatus, and each of the plurality of operations being executable by the received user voice input, and
      based on a user input for selecting an operation from among the plurality of operations of the UI being received, perform the selected operation,
   wherein the displayed UI comprises a user selection window that displays the plurality of operations comprising an operation of changing a TV channel to a channel and an operation of displaying an internet search result which is executable by the received user voice input.

2. The display apparatus according to claim 1, wherein the processor is configured to:
   identify a function which is currently performed in the display apparatus, and
   wherein the plurality of operations displayed in the user selection window are arranged according to a degree of similarity of each of the plurality of operations to the identified function.

3. The display apparatus according to claim 1, wherein the UI comprises a menu item for stopping a previously performed operation.

4. The display apparatus according to claim 1, further comprising a storage,
wherein the processor is configured to:
control the storage to store information on the performed operation, and
based on a second voice user input which is same as the received user voice input, perform the operation based on the stored information.

5. The display apparatus according to claim 1, wherein the plurality of operations further comprise at least one of an operation of executing a content corresponding to the received user voice input or an operation of selecting a TV menu corresponding to the received user voice input.

6. A control method of a display apparatus, the control method comprising:
receiving a user voice input;
displaying a user interface (UI) comprising a plurality of operations corresponding to the received user voice input, the plurality of operations being available in the display apparatus, and each of the plurality of operations being executable by the received user voice input, and
based on a user input for selecting an operation-among from among the plurality of operations of the UI being received, performing the selected operation,
wherein the displayed UI comprises a user selection window that displays the plurality of operations comprising an operation of changing a TV channel to a channel and an operation of displaying an internet search result which is executable by the received user voice input.

7. The control method according to claim 6, further comprising identifying a function which is currently performed in the display apparatus, and
wherein the plurality of operations displayed in the user selection window are arranged according to a degree of similarity of each of the plurality of operations to the identified function.

8. The control method according to claim 6, wherein the UI comprises a menu item for stopping a previously performed operation.

9. The control method according to claim 6, further comprising storing information on the performed operation, and
wherein the performing the selected operation comprises, based on a second voice user input which is same as the received user voice input, performing the operation based on the stored information.

10. The control method according to claim 6,
wherein the plurality of operations comprise at least one of an operation of executing a content corresponding to the user voice input or an operation of selecting a TV menu corresponding to the user voice input.

\* \* \* \* \*